United States Patent [19]

Mercier et al.

[11] Patent Number: 4,848,425
[45] Date of Patent: Jul. 18, 1989

[54] FELLING HEAD WITH SWINGING CUTTER BAR

[76] Inventors: Gilles Mercier, 125, Rang 9; Rene Gelinas, 871, 11e Ave.; Jacques Mercier, 873, 11e Ave., all of Senneterre, Que., Canada, J0Y 2M0; Paul Mercier, 253B rue Pierre, Val d'Or, Que., Canada, J9P 4L8

[21] Appl. No.: 219,566

[22] Filed: Jul. 15, 1988

[51] Int. Cl.⁴ .............................................. A01G 23/08
[52] U.S. Cl. .................................... 144/34 R; 83/613; 83/928; 144/336
[58] Field of Search ................. 83/613, 698, 638, 928; 144/2 Z, 3 D, 34 R, 335, 336

[56] References Cited

U.S. PATENT DOCUMENTS

| | | |
|---|---|---|
| 3,902,538 | 9/1875 | Muirhead ........................... 144/34 R |
| 3,970,125 | 7/1976 | Muirhead et al. . |
| 4,039,010 | 8/1977 | Tucek . |
| 4,153,086 | 5/1979 | Oldenburg . |
| 4,540,033 | 9/1985 | Wehr et al. ....................... 144/34 R |
| 4,763,705 | 8/1988 | Johnson ........................... 144/34 R |

FOREIGN PATENT DOCUMENTS

| | | |
|---|---|---|
| 960549 | 1/1975 | Canada . |
| 1066419 | 3/1977 | Canada . |
| 1061680 | 9/1979 | Canada . |

Primary Examiner—W. Donald Bray
Attorney, Agent, or Firm—Shlesinger & Myers

[57] ABSTRACT

A tree felling head has a frame with two laterally spaced-apart support means at the bottom of the frame. A cutting unit is pivotally mounted at one end on one of the support means while the other end of the cutting unit is supported on the other support means. The cutting unit carries a rotatable cutting bar. Means pivot the cutting unit, while its other end is guided on the other support means, and while its cutting bar is rotated, to move the cutting bar against a tree and to cut through it.

The cutting unit also has an accumulating plate located immediately behind the cutting bar for accumulating cut trees thereon.

5 Claims, 4 Drawing Sheets

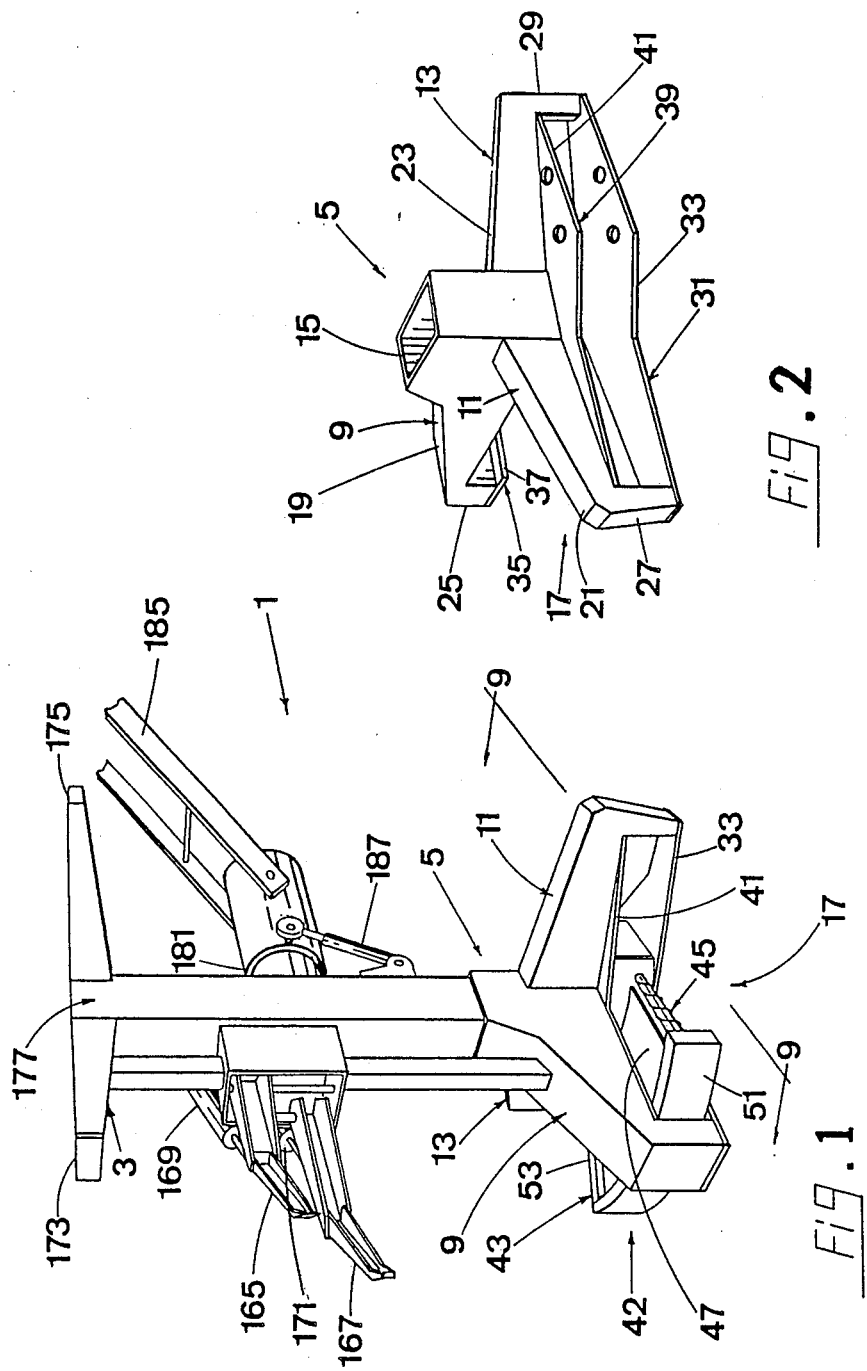

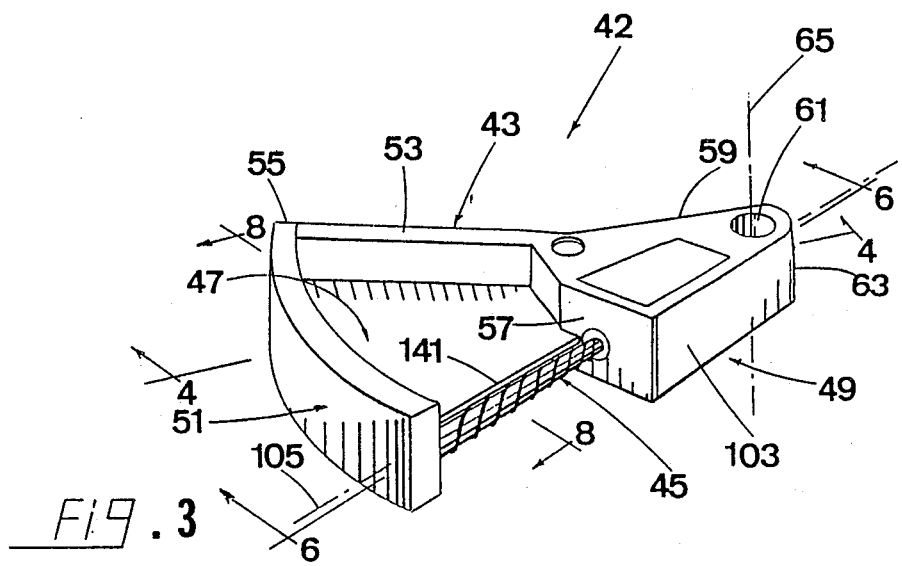
_Fig_.3
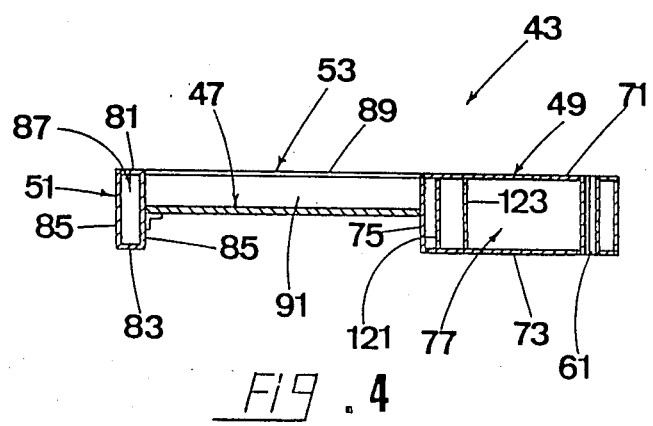
_Fig_.4

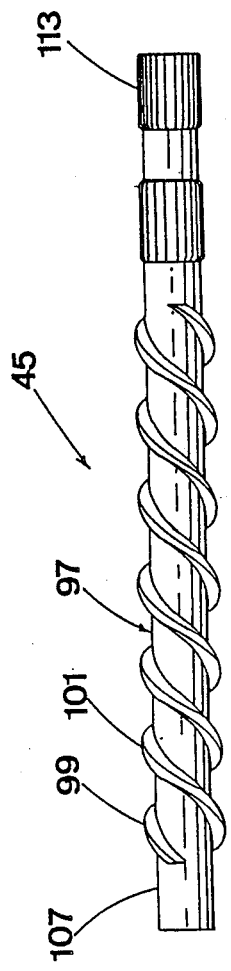
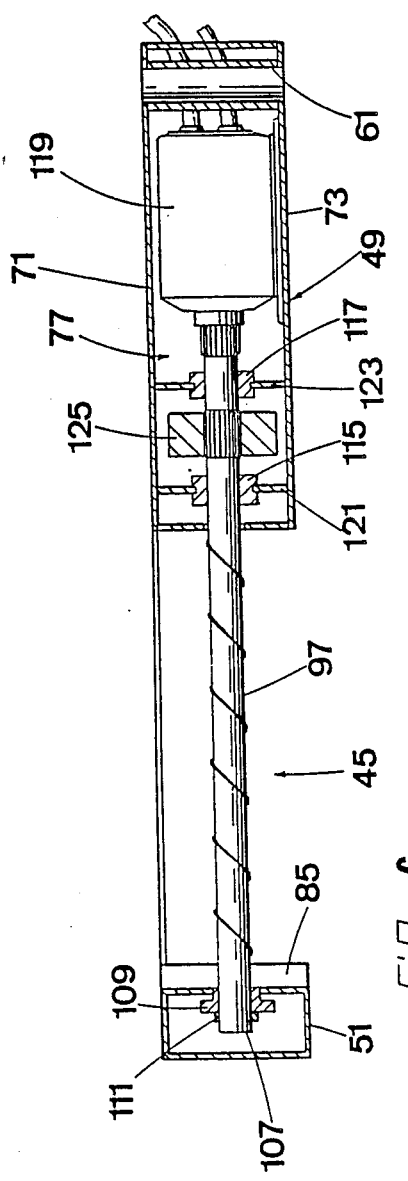

FELLING HEAD WITH SWINGING CUTTER BAR

BACKGROUND OF THE INVENTION

1. FIELD OF THE INVENTION

This invention is directed toward an improved tree felling head.

The invention is more particularly directed toward an improved tree felling head of the type employing a rotatable, swingable cutting bar.

2. DESCRIPTION OF THE PRIOR ART

Tree felling heads employing rotatable, swingable, cutting bars are well known. Examples of such felling heads are shown in Canadian Patents Nos. 960,549; 1,006,419 and 1,061,680. In all the above patents, the cutting bar is supported at its ends in a carrying frame which in turn is pivotally supported at one end on a felling head frame. The carrying frame, carrying the rotating cutting bar, is swung in a cantilevered manner to swing the cutting bar against a tree to have the bar cut through it.

Using a swingable cutting bar to fell trees has several advantages. The cutting bar, its drive means, and its support are all quite light making for a lighter and more maneuverable felling head. Less power is required to cut the trees and the cutting bar gives a clean cut. However the swingable, cantilevered cutting bars are not too strong. The weight of a cut tree resting on the carrying frame results in large bending forces on the frame and its cantilever mounting. Frequent maintenance is required and breakdowns often occur in these felling heads. Also, known felling heads employing cutting bars have binding pro legs. The chips and sawdust produced by the bars during cutting are often difficult to clear from the cut and binding can occur. Further all of the known felling heads employing swingable cutting bars have no known accumulating capabilities. Thus any tree harvesting operation employing these felling heads is a slow operation, since the felling head can only handle one tree at a time.

It is also known to provide tree felling heads employing rotatable, slidable, cutting bars. Examples of such felling heads are shown in U.S. Pat. Nos. 4,153,086 and 4,540,033. These felling heads have an advantage over the felling heads using swingable, cantilevered cutting bars in that the carrying frame supporting their cutting bars can be securely supported at both ends. Thus these felling heads are much stronger and require less maintenance. Also, as shown in U.S. Pat. No. 4,540,033, the felling head employing a slidable cutting bar can be used with accumulating means. Thus this felling head is more productive in harvesting trees. However, slidable bar felling heads are quite large in size compared to swingable bar felling heads and thus are cumbersome and awkward to handle in the bush.

SUMMARY OF THE INVENTION

It is the purpose of the present invention to provide an improved felling head of the type employing a rotating, swinging cutting bar which is much stronger than known felling heads of this type. It is another purpose of the present invention to provide an improved felling head of the type employing a rotating, swinging cutter bar which can accumulate cut trees. It is a further purpose of the present invention to provide an improved felling head which is compact in size, easy to maneuver and handle, and less likely to bind in operation.

In accordance with the present invention there is provided a felling head having a bottom frame which supports a swinging cutting unit, carrying a rotatable cutting bar, at both ends. The swinging cutting unit is also provided with an accumulating plate on which cut trees can be accumulated. The bottom frame of the felling head defines two laterally spaced-apart support surfaces on which the ends of the cutting unit rest. The cutting unit is pivotally mounted adjacent one end to the bottom frame on one of the support surfaces. Means are provided for swinging the cutting unit relative to the bottom frame about its pivot mounting while its other end is slidably supported on the other support surface. Motor means on the cutting unit rotate the cutting bar, located near the other end of the cutting unit, to cut through a tree as the cutting unit is swung about its pivot mounting.

An accumulating plate is provided on the swingable cutting unit right behind the rotatable cutting bar. As the bar finishes cutting through the tree, the butt end of the cut tree rests on the plate. Accumulating arms on the felling head hold the cut tree on the accumulating plate. Swinging movement of the cutting unit is stopped as soon as the tree is cut through. The felling head is next moved adjacent another tree and swinging movement of the cutting unit is started again from the point at which it stopped, while the cutting bar rotates, to cut through another tree.

The felling head of the present invention provides a support frame that securely supports the cutting unit, carrying the rotatable bar, at both ends as it swings through a cut. This is done without interfering with the cutting operation. Thus the felling head is much stronger, and more maintenance free, than known felling heads employing cantilevered cutting units. The swingable cutting unit can also accumulate cut trees making the felling head more efficient in operation.

The invention is particularly directed toward a tree felling head having a bottom support frame, the bottom support frame having two laterally spaced-apart support means, a cutting unit, means for pivotally mounting the cutting unit at one end on one of the support means with the other end of the cutting unit supported on the other support means, means for swinging the cutting unit about its pivot mounting while the other end of the cutting unit is slidably supported on the other support means, and means on the cutting unit for cutting through a tree as the cutting unit is swinging.

The cutting means on the cutting unit comprises a cutting bar rotatably mounted at its ends on the cutting unit and a motor on the cutting unit for rotating the cutting bar.

The cutting unit carries an accumulating plate just behind the cutting means. The butt end of the cut tree rests on the plate. Accumulating arms on the felling head hold the cut tree on the plate while the felling head is moved to position itself at another tree to be cut.

BRIEF DESCRIPTION OF THE DRAWINGS

FIG. 1 is a perspective view of the felling head of the present invention;

FIG. 2 is a perspective view of the bottom support frame of the felling head;

FIG. 3 is a perspective view of the cutting unit;

FIG. 4 is a cross-section view of the cutting unit frame only taken along line 4—4 in FIG. 3;

FIG. 5 is a front view of the cutting bar;

FIG. 6 is a cross-section view of the cutting unit taken along line 4—4 in FIG. 3;

DESCRIPTION OF THE PREFERRED EMBODIMENT

Figure 7:
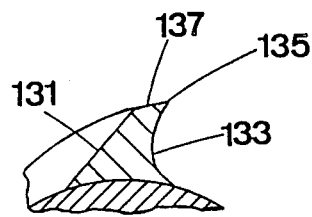
FIG. 7 is a cross-section view of a cutting tooth on the cutting bar.

The tree felling head 1 of the present invention, as shown in FIG. 1, has an upper frame 3 and a bottom support frame 5 connected to the bottom of the upper frame 3. The bottom support frame 5 has three legs 9, 11, 13 extending radially outwardly from a central vertical post 15 as shown in FIG. 2. The three legs 9, 11, 13 are roughly equally spaced apart with the space between the legs 9, 11 forming a tree receiving space 17. Each leg 9, 11, 13 has a generally horizontal portion 19, 21, 23 and a shorter generally vertical portion 15, 17, 19 respectively. The vertical portions 25, 27, 29 extend downwardly from the ends of the respective horizontal portions 19, 21, 23. First support means 31, in the form of a first support plate 33, are mounted to the ends of the vertical portions 27, 29 of legs 11, 13. The first support plate 33 extends between the legs 11, 13 providing a mounting platform. Second support means 35, in the form of a second support plate 37, are mounted at the end of the vertical portion 25 of leg 9. This second support plate 37 extends a short distance from vertical portion 25 of leg 9 toward the first support plate 33 but is spaced horizontally some distance from it. Third support means 39, in the form of a third support plate 41 is mounted between the horizontal portions 21, 23 of legs 11, 13 above the first support plate 33 and parallel to it.

The tree felling head 1 includes a cutting unit 42. The cutting unit 42 as shown in FIG. 3 has a cutting frame 43 supporting both a rotatable cutting bar 45, and a tree accumulating plate 47. The cutting frame 43 has a base 49 and a support arm 51 spaced laterally from the base 49 but connected to it by a cross-member 53. The support arm 51 is connected at one end 55 to one end of the cross-member 53. The other end of the cross-member 53 is connected to one end 57 of the base 49 adjacent one side 59 of the base. A vertical, tubular, pivot mounting 61 is provided in the base 49 adjacent its other end 63. The support arm 51 is curved along an arc having its center of curvature at the pivot axis 65 defined by the pivot mounting 61. The one end 57 of the base 49 is similarly curved about the pivot axis 65. The cross-member 53 extends generally radially to the pivot axis 65.

The base 49 of the cutting frame 43 is preferably constructed from parallel top and bottom plates 71, 73 joined by side plates 75 forming an enclosure 77 within the base as shown in FIG. 4. The support arm 51 is also preferably constructed with parallel top and bottom side plates 81, 83 joined by side plates 85 to form a box beam construction. An enclosed space 87 is provided at the free end of the arm 51. The cross-member 53 can comprise a top plate 89 and a side plate 91. The plates forming the base 49, support arm 51, and cross-member 53 are welded together to form a strong, unitary structure.

The cutting bar 45 as shown in FIG. 5, comprises a cylindrical rod 97 having two helical cutting teeth 99, 101 extending over a major portion of the bar length. The cutting bar 45 is mounted on the cutting frame 43 between the free end of the support arm 51 and base 49 adjacent its other side 103. The cutting bar 45 is aligned with an imaginary radial line 105 extending from the pivot axis 65 of the cutting frame 43. The outer end 107 of the rod 97 is rotatably mounted in a flanged bearing 109 which in turn is mounted in the portion of the inner side plate 85 of the support arm 51 defining enclosure 87. A collar 111, fastened to the end 107 of the rod 97, retains it in the bearing 109.

The other end 113 of the rod 97 is mounted through two spaced-apart roller bearings 115, 117 in the base 49 of frame 43 and connected to a hydraulic motor 119 mounted in enclosure 77. The roller bearings 115, 117 are mounted in support walls 121, 123 extending between the top and bottom plates 71, 73 of the base. A small fly-wheel 125 can be mounted on the rod 97, between the bearings 115, 117 to smooth the operation of the cutter bar during transition between difficult and easy parts of the cut as is well known.

Each helical cutting tooth 99, 101 on the bar 45, when viewed in cross-section as shown in FIG. 7 has a sloping back side 31 and a radiused front side 133 providing a cutting edge 135 at the top, front edge of the tooth. The top 137 of the tooth has a slight rake from edge 135 to the back side 131.

Figure 8:
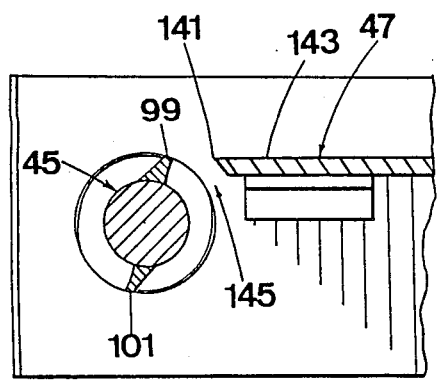
FIG. 8 is a cross-section view of the cutting unit taken along line 8—8 of FIG. 3.
Figure 9:
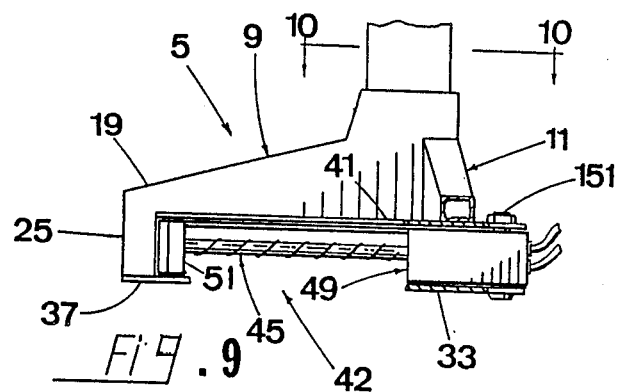
FIG. 9 is a cross-section view of the felling head taken along line 9—9 of FIG. 1.

The tree accumulating plate 47 extends between, and is fixed to, the support arm 51 and base 49. The plate 47 is also fixed to cross-member 53. The free edge 141 of the plate 47 is located adjacent to, and parallel with, the cutting bar 45 as shown in FIG. 8. The upper surface 143 of the plate 47 is level with the top of the teeth of the cutting bar 45 and edge 141 slopes away from the cutting bar 45 to provide a chip exit slot 145. Chips developed during cutting can be partly eliminated through the slot 145 into the open part of the kerf behind the cutter bar 45 and beneath plate 47. This reduces the tendency for the cutting bar 45 to bind during operation. The accumulating plate 47, fastened to the base 49, the support arm 51 and the cross-member 53 make the cutting frame 43 very strong.

Figure 10:
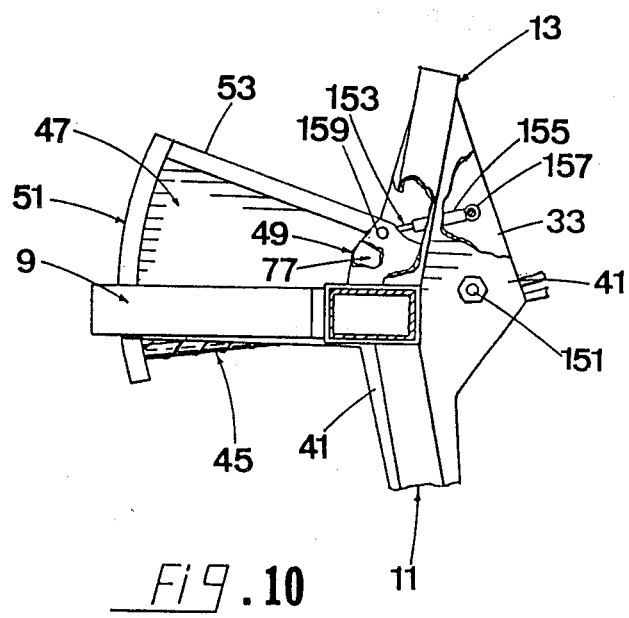
FIG. 10 is a cross-section view taken along line 10—10 in FIG. 9, and partially broken away.

The cutting unit 42 is swingably mounted on the bottom support frame 5 of the felling head 1. The base 49 of the cutting frame 43 of the cutting unit 42, forming one end of the cutting unit, rests on the first support plate 33. A pivot pin 151 is mounted between the first and third support plates 33, 41 of the bottom support frame 5 and through the pivot mounting 61 in base 49 to pivotally connect the cutting unit 42 to the bottom support frame 5 at one end. The curved support arm 51 of the cutting frame 43, forming the other end of the cutting unit 42 rests on the second support plate 37. Actuating means 153 are provided for swinging the cutting unit 42 about pivot pin 151 to move it through the tree receiving space 17 between the bottom support frame legs 9, 11. The actuating means 153 as shown in FIG. 10 can comprise a hydraulic actuating cylinder 155 pivotally mounted at one end, via pivot means 157 to the bottom support frame 5 between the first and third support plates 33, 41.

The other end of the actuating cylinder 155 is mounted via pivot means 159 to the base 49 of the cutting frame 43 between the top and bottom plates 71, 73. The pivot means 157 is mounted between the first and third support plates 33, 41 spaced laterally from pivot pin 151. The pivot means 159, located within the enclosure 77 in base 49 is mounted between the top and bottom plates 71, 73 of the frame base 49 near its front end 57. An opening is provided in the side wall 75 of the base 45 to allow the actuating cylinder 155 into the enclosure 77.

The felling head 1 is provided with a pair of accumulating arms 165, 167 pivotally mounted on the upper frame 5 as shown in FIG. 1. The arms 165, 167 are each actuated by their own hydraulic actuators 169, 171. The accumulating arms, and their operation are well known. The top of the upper frame section 5 also carries two fixed tree positioning arms 173, 175. The first arm 173 generally overlies leg 9 of the bottom support frame 5 and the second arm 175 generally overlies leg 11. The fixed arms 173, 175 form a second tree receiving space 177 above the first tree receiving space 17. The accumulating arms 165, 167 are located about midway between the two tree receiving spaces 17, 177 defined by legs 9, 11 and arms 173, 175 respectively.

A mounting bracket 181 is pivotally mounted by a horizontal pivot pin not shown to the back of the upper frame 5 behind the accumulating arms 165, 167. The bracket 181 is used to connect the felling head 1 to a boom 185 on a carrying vehicle. A hydraulic actuator 187 is connected between the bracket 181 and the upper frame 5 to tilt or rotate the felling head 1 relative to the bracket 181, and the boom, to better handle felled trees.

In operation, the felling head 1, in an upright position, is maneuvered by an operator, on the carrying vehicle via the boom, to position it adjacent a growing tree. The head is maneuvered to locate the tree in the tree receiving spaces 17, 177. At this time, the cutting unit 42 is in a retracted position with the cutting bar 45 safely out of the way under leg 9 of the bottom support frame 5. Preferably, the tree is located against the leg 9 and arm 173 and the tree can now be gripped against these members by one or both accumulating arms 165, 167. The actuating cylinder 155 is then operated to swing the cutting unit 42 into the tree receiving space 17 from under leg 9 and motor 119 is simultaneously operated to rotate the cutting bar 45 so that the bar 45 cuts through the tree as the bar 45 is moved against the tree. As the cutting unit 42 swings into the tree receiving space 17, it is supported at its outer end by support arm 51 resting on the second support plate 37 and at its inner end by the base 49 resting on the first support plate 33. When the tree is cut through, it rests on the accumulating plate 47 behind the cutting bar 45 held by the accumulating arms. Swinging movement of the cutting unit 42 is halted. The felling head 1, carrying the cut tree on the accumulating plate 47, is now moved by the boom 185 against the next tree to be cut. This next tree is gripped by at least one accumulating arm and the cutting unit 42 is moved again from its previous stopped position, while cutting bar 45 is rotated, to cut through the second tree. The cut second tree is also carried on the accumulating plate 47. If the trees being cut are quite small they need not be gripped by the accumulating arms before cutting. The accumulating plate 47 may be moved back off some of the cut, gripped trees if desired and then moved forward again on the next cutting stroke to support the trees while the accumulating arms release and move to grip the next tree being cut. Once the felling head has accumulated a number of cut trees, it is moved and tilted to dump the group of trees in a pile on the ground.

It will be seen that the improved felling head is quite compact and sturdy. Since the swinging cutting unit 42 is supported at both ends, it is subjected to less stress than a cantilevered unit. However the unit can still accumulate trees to speed up the harvesting process. The cutting bar is accessible and easily serviced or replaced.

I claim:

1. A tree felling head having:
   a bottom support frame;
   the bottom support frame having two laterally spaced apart support means;
   a cutting unit: the cutting unit having:
      a c-shaped cutting frame;
         the cutting frame having a base, a support arm laterally spaced from the base, and a cross-member joining one end of the support arm to the base;
      a cutting bar;
         the cutting bar rotatably mounted at one end to the other end of the support arm of the cutting frame and at its other end to the base of the cutting frame; and
      means for rotating the cutting bar;
   means for pivotally mounting the cutting unit on the bottom support frame with the base of the cutting frame connected by pivot means on one of the support means and the support arm of the cutting frame slidably supported on the other of the support means; and
   means for swinging the cutting unit about the pivot means while the support arm of the cutting frame slides on the other support means, and while the cutting bar is being rotated, to have the cutting bar cut through a tree.

2. A tree felling head as claimed in claim 1 including an accumulating plate mounted on the c-shaped cutting frame, the accumulating plate located immediately behind the cutting bar and connected to the support arm and to the base.

3. A tree felling head as claimed in claim 2 wherein the top surface of the accumulating plate is level with the top of the cutting bar, the plate having an edge closely adjacent to and parallel to the cutting bar, the edge being tapered rearwardly and downwardly.

4. A tree felling head as claimed in claim 2 wherein the support arm of the cutting frame is curved along an arc having its center of curvature at the pivot means connecting the cutting frame to the bottom support frame, the cross-member extending generally radially from the pivot means.

5. A tree felling head as claimed in claim 2 wherein the other support means is supported from the one support means by a cantilevered leg extending over the cutting unit.

* * * * *